(12) United States Patent
Atarius et al.

(10) Patent No.: US 6,873,648 B1
(45) Date of Patent: Mar. 29, 2005

(54) METHOD AND APPARATUS FOR FAST DETECTION OF LOCATIONS OF PATH RAYS IN A RECEIVER HAVING MULTIPLE TIME REFERENCES

(75) Inventors: Roozbeh Atarius, Morrisville, NC (US); Erik Dahlbäck, Verberod (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/518,063

(22) Filed: Mar. 2, 2000

(51) Int. Cl.⁷ .............................................. H04B 1/707
(52) U.S. Cl. ..................................................... 375/147
(58) Field of Search ................................ 375/130, 140, 375/147–148, 150, 152, 316, 324, 326, 141, 142, 143, 340, 343

(56) References Cited

U.S. PATENT DOCUMENTS

| | | | |
|---|---|---|---|
| 5,353,332 A | | 10/1994 | Raith et al. |
| 5,490,165 A | | 2/1996 | Blakeney, II et al. |
| 5,790,589 A | * | 8/1998 | Hutchison et al. .......... 375/149 |
| 5,818,866 A | | 10/1998 | Wilk |
| 6,366,599 B1 | * | 4/2002 | Carlson et al. ............. 375/130 |
| 6,453,181 B1 | * | 9/2002 | Challa et al. ............... 455/574 |
| 6,560,273 B1 | * | 5/2003 | Sourour et al. ............ 375/148 |
| 2002/0101912 A1 | * | 8/2002 | Phelts et al. ................ 375/148 |

FOREIGN PATENT DOCUMENTS

| | | |
|---|---|---|
| EP | 0 877 493 A2 | 11/1998 |
| GB | 2324681 | 10/1998 |
| JP | 10190522 | 7/1998 |
| WO | 97/19522 A2 | 5/1997 |

* cited by examiner

*Primary Examiner*—Kevin Burd
(74) *Attorney, Agent, or Firm*—Potomac Patent Group PLLC

(57) ABSTRACT

Locations of path rays in a multi-path channel receiver having multiple time references are detected, e.g., when the receiver switches time references. Locations of received path rays are searched for and determined. The locations are tracked for a predetermined amount of time. If the locations are lost after a predetermined amount of time, a new search for the locations of the received path rays is initiated. The searching may include determining a probable location of a most significant path ray, shifting the location within a predetermined interval, analyzing each shifted location to determine whether the shifted location corresponds to the actual location of the received path ray, and depending on the analysis results, completing the search or determining a probable location of a next most significant ray. The analysis may be performed by correlating each shifted location with a pilot sequence and determining if the correlation results exceed a predetermined threshold. If the correlation results do not exceed the threshold, a determination is made whether all the most significant path rays have been analyzed, and if so, a complete search for the path ray location is initiated. When switching from a time reference of low accuracy to a time reference of high accuracy, the low accuracy time reference may be calibrated to the high accuracy time reference based on averaged measurements of the ratio of clock cycles of the time reference of high accuracy to the clock cycles of the time reference of low accuracy.

19 Claims, 4 Drawing Sheets

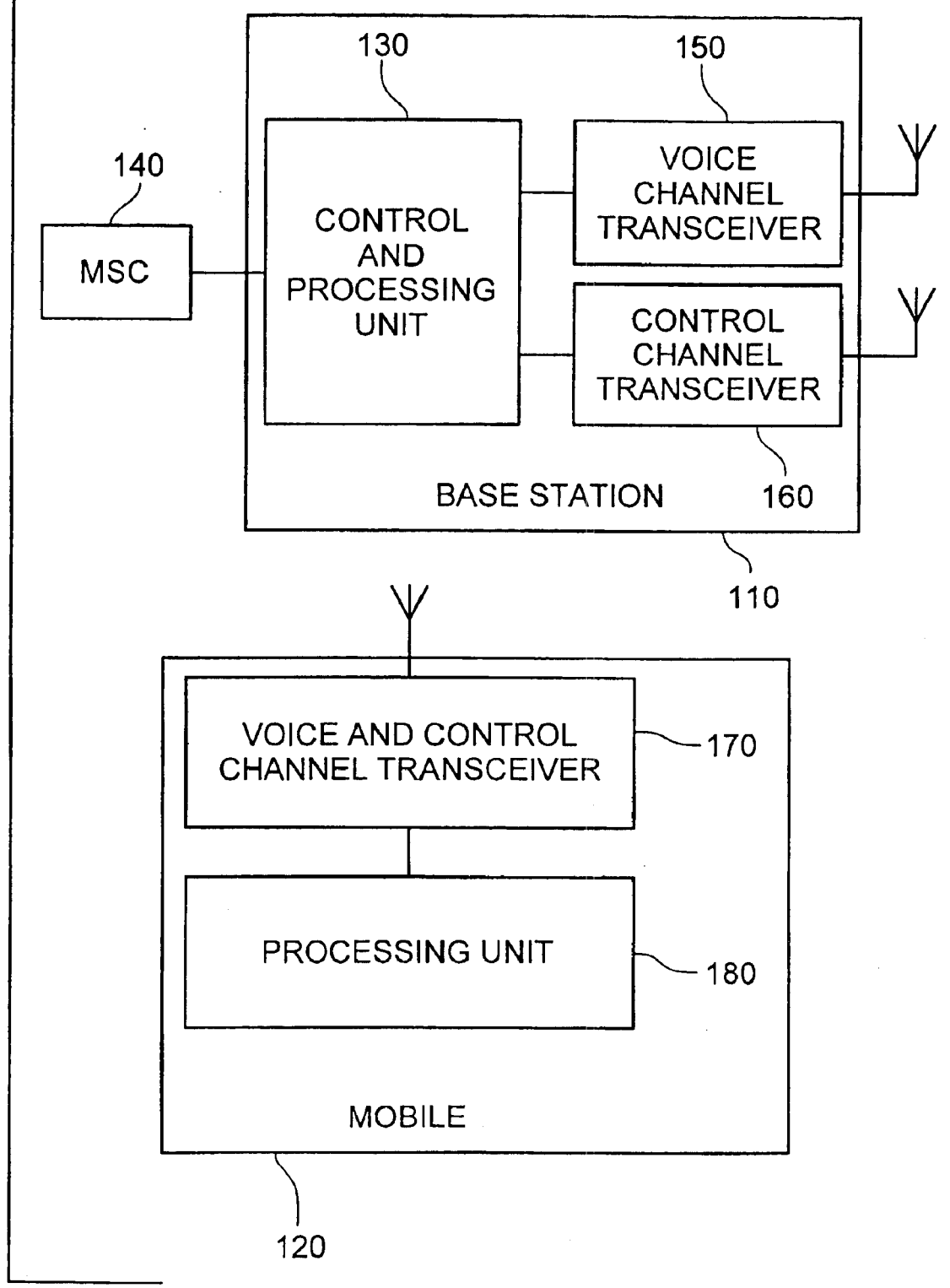

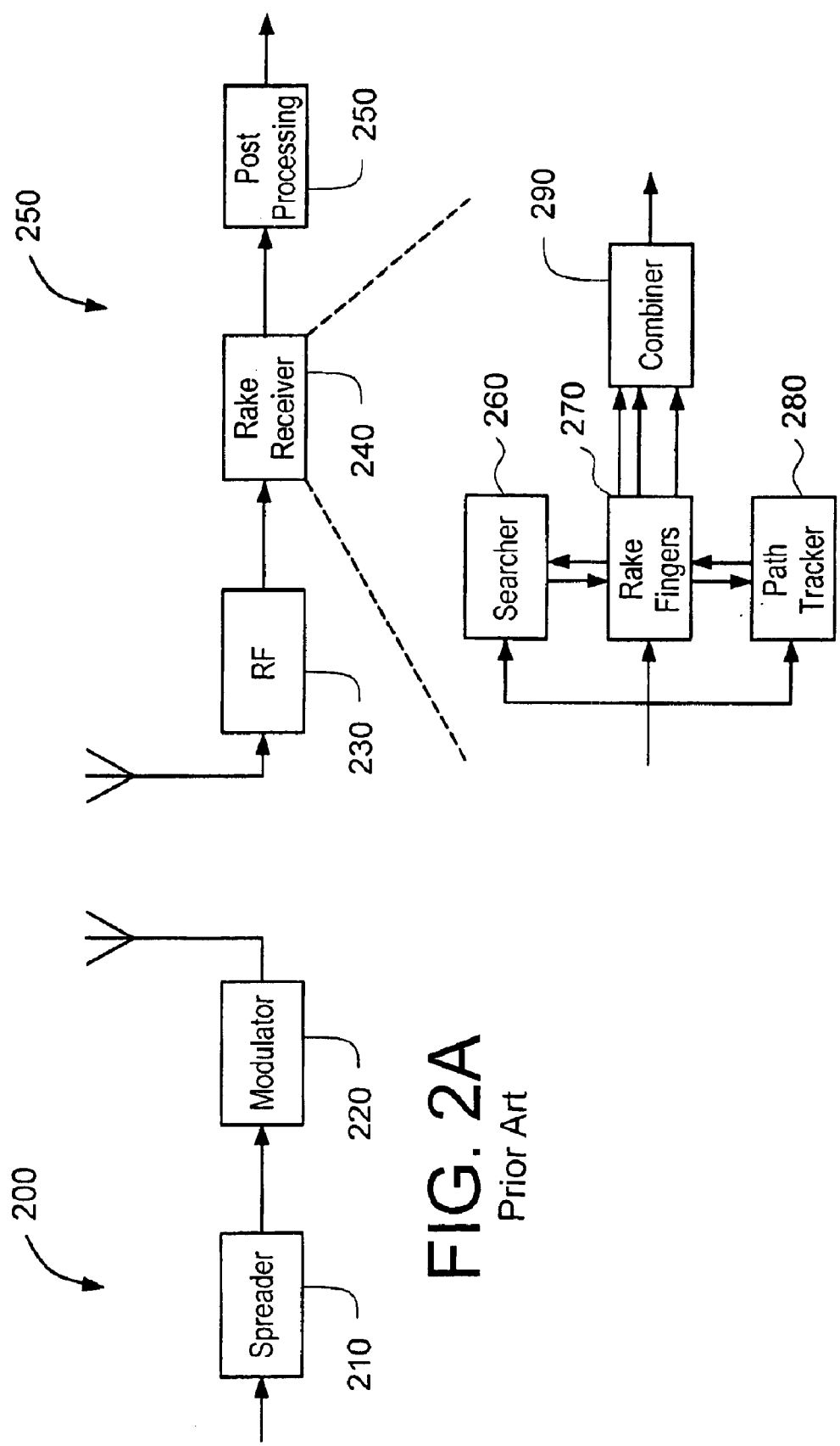

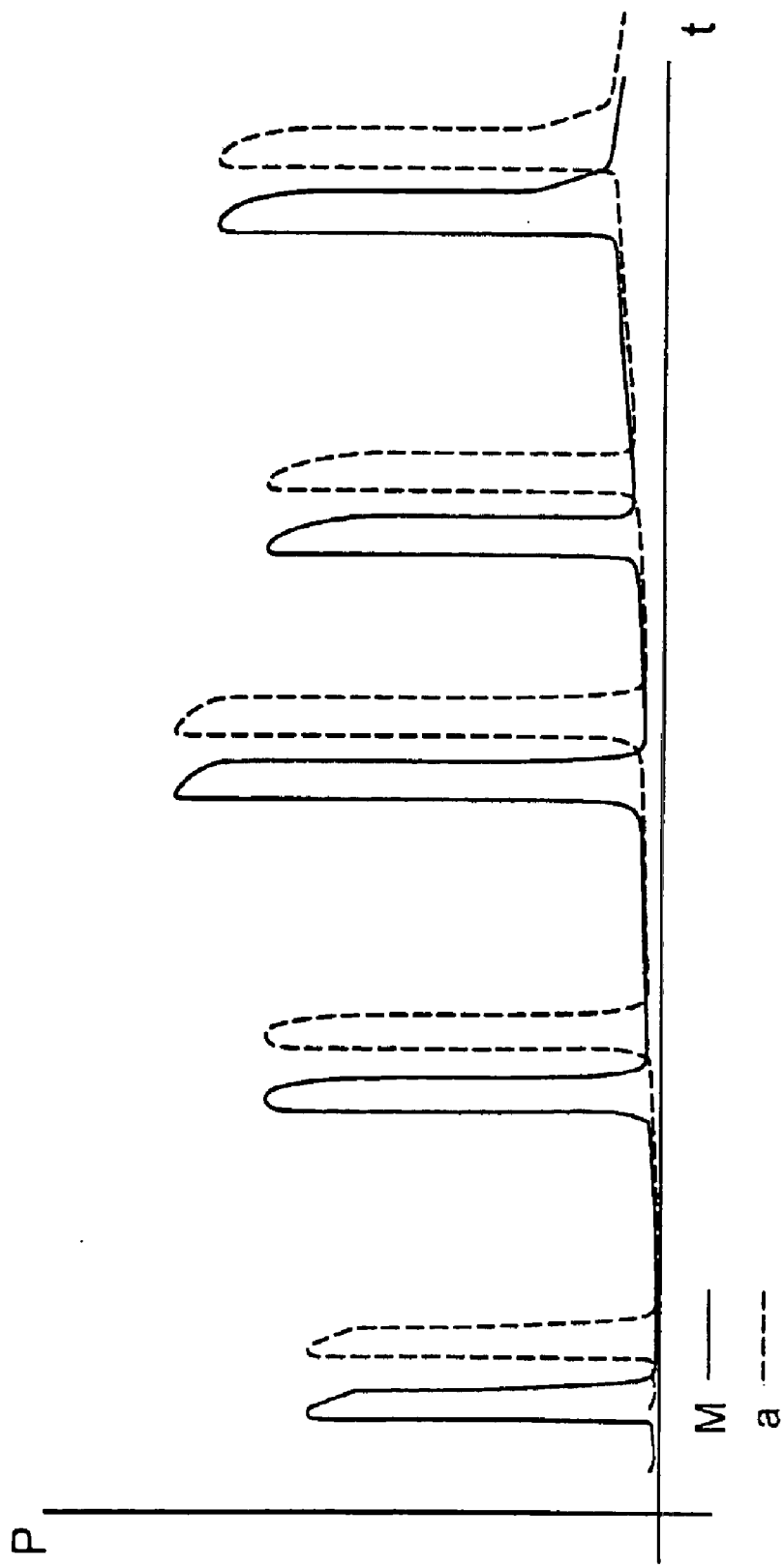

METHOD AND APPARATUS FOR FAST DETECTION OF LOCATIONS OF PATH RAYS IN A RECEIVER HAVING MULTIPLE TIME REFERENCES

BACKGROUND

This invention relates generally to a method and apparatus for detecting a received signal in a communication system. More particularly, this invention relates to a method and apparatus for detecting locations of path rays in a multi-path receiver having multiple time references.

FIG. 1 is a block diagram of an exemplary cellular radiotelephone system, including an exemplary base station (BS) 110 and a mobile station (MS) 120. Although denoted a "mobile station", the station 120 may also be another type of remote station, e.g., a fixed cellular station. The BS includes a control and processing unit 130 which is connected to a mobile switching center (MSC) 140 which in turn is connected to a PSTN (not shown). General aspects of such cellular radiotelephone systems are known in the art. The BS 110 handles a plurality of voice channels through a voice channel transceiver 150, which is controlled by the control and processing unit 130. Also, each BS includes a control channel transceiver 160, which may be capable of handling more than one control channel. The control channel transceiver 160 is controlled by the control and processing unit 130. The control channel transceiver 160 broadcasts control information over the control channel of the BS or cell to mobiles locked to that control channel. It will be understood that the transceivers 150 and 160 can be implemented as a single device, like the voice and control transceiver 170, for use with control and traffic channels that share the same radio carrier.

The MS 120 receives the information broadcast on a control channel at its voice and control channel transceiver 170. Then, the processing unit 180 evaluates the received control channel information, which includes the characteristics of cells that are candidates for the MS to lock on to, and determines on which cell the MS should lock. Advantageously, the received control channel information not only includes absolute information concerning the cell with which it is associated, but also contains relative information concerning other cells proximate to the cell with which the control channel is associated, as described for example in U.S. Pat. No. 5,353,332 to Raith et al., entitled "Method and Apparatus for Communication Control in a Radiotelephone System".

Modern communication systems, such as a cellular radiotelephone system of the type described above and satellite radio systems, employ various modes of operation (analog, digital, dual mode, etc.) and access techniques such as frequency division multiple access (FDMA), time division multiple access (TDMA), code division multiple access (CDMA), and hybrids of these techniques.

In North America, a digital cellular radiotelephone system using TDMA is called the Digital Advanced Mobile Phone System (D-AMPS), some of the characteristics of which are specified in the TIA/EIA/IS-136 standard published by the Telecommunications Industry Association and Electronic Industries Association (TIA/EIA). Another digital communication system using direct sequence CDMA is specified by the TIA/EIA/IS-95 standard. There are also frequency hopping TDMA and CDMA communication systems, one of which is specified by the EIA SP 3389 standard (PCS 1900). The PCS 1900 standard is an implementation of the GSM system, which is common outside North America, that has been introduced for personal communication services (PCS) systems.

Several proposals for the next generation of digital cellular communication systems are currently under discussion in various standards setting organizations, which include the International Telecommunications Union (ITU), the European Telecommunications Standards Institute (ETSI), and Japan's Association of Radio Industries and Businesses (ARIB).

Direct-sequence (DS) spread-spectrum modulation is commonly used in CDMA systems, in which each information symbol is represented by a number of "chips." Representing one symbol by many chips gives rise to "spreading," as the latter typically requires more bandwidth to transmit. The sequence of chips is referred to as the spreading code or signature sequence. At a DS receiver, e.g., a Rake Receiver, the received signal is despread using a despreading code, which is typically the conjugate of the spreading code. IS-95 and J-STD-008 are examples of DS CDMA standards.

In the mobile radio channel, multi-path is created by reflection of the transmitted signal from obstacles in the environment, e.g., buildings, trees, cars, etc. In general, the mobile radio channel is a time varying multi-path channel due to the relative motion of the structures that create the multi-path.

A characteristic of the multi-path channel is that each path through the channel may have a different phase. For example, if an ideal impulse is transmitted over a multi-path channel, each pulse of the received stream of pulses generally has a different phase from the other received pulses. This can result in signal fading.

In a CDMA system, signal fading is combated by combining the pulses received over multiple paths using a Rake Receiver. Typically, the channel is modeled as discrete MS. The locations of the received signal path rays are first found by using a searcher, and then these path rays are combined by using a maximum ratio combiner. A tracker is used to track the locations of the path rays.

FIGS. 2A and 2B illustrate a typical DS-CDMA system including a Transmitter 200 and a receiver 250, respectively. The Transmitter 200 includes a Spreader 210, a Modulator 220, and an antenna. The Spreader 210 spreads the signal to be transmitted, and the Modulator 220 modulates the spread signal on a carrier frequency. The modulated signal is then transmitted via the antenna in the Transmitter 200.

The Receiver 250 includes an antenna, an RF Pre-Processing unit 230, a Rake Receiver 240, and a Post-Processing unit 250. The transmitted signal is received via the antenna in the Receiver 250. The RF Pre-Processing unit 230 tunes to the desired band and desired carrier frequency, then demodulates, amplifies, mixes, and filters the signal down to baseband.

The Rake Receiver 240 despreads the demodulated signal and detects the digital symbols that were transmitted. It may produce soft information as well, which gives information regarding the likelihood of the detected symbol values.

The Post-Processing unit 250 performs functions that depend highly on the particular communications application. For example, it may use the soft detected values to perform forward error correction decoding or error detection decoding. It may convert digital signals into speech using a speech decoder.

An MS, in the active mode, transmits and receives data. In the active mode, the MS uses a crystal oscillator with high accuracy and low phase noise as a reference clock. For instance, in the Global System for Mobile Communications (GSM), it is proposed to use a 13 MHZ crystal with high accuracy during the time the MS is awake. This crystal is synchronized with the BS to provide synchronous transmission and reception. This kind of crystal consumes a relatively large amount of current and is not necessary when the MS is, e.g., asleep in the idle mode, not receiving or transmitting data.

The MS only wakes up once in a while in the idle mode to listen to the Paging Channel (PCH) in order to receive paging messages from the BS. Hence, a crystal with low accuracy and low current consumption can be employed when the MS is asleep. An example of such a crystal is a Real Time Crystal (RTC), which is a 32 KHz crystal. An RTC has high phase noise and is much more sensitive to temperature variations than, e.g., a 13 MHz crystal. Employing this crystal is feasible in the sleep mode since the MS needs only to have knowledge about the time.

When the MS wakes up to listen to the PCH, the crystal with high accuracy and also high current consumption can be used. Since the wake up time is only a small part of the total time (if the MS is not paged), by switching between these crystals the MS can save power, thereby increasing its standby time.

It is known to use different clocks in different modes. For example, GB 232 4681 discloses a method for conserving energy by entering a lower power sleep mode. A clock with coarse resolution is used while the MS is in an idle mode. An offset between this clock and a fine resolution clock is determined. This offset is adjusted when the MS exits the low power sleep mode. The sleep time is measured using the coarse resolution clock so that the MS prewakes up to initiate matching signals to the pseudorandom noise (PN) code.

While switching from the crystal with low accuracy to the crystal with high accuracy conserves current, this affects the locations of the path rays. Due to the inaccuracy of the crystal which is used during the idle mode, the locations of the path rays may be lost when the MS is asleep during the idle mode and thus may not be able to be tracked when the MS wakes up again. In a CDMA system, this is considered to be a dilemma since the locations of the path rays are not trackable any longer, and the searcher must be activated every time the MS wakes up to locate the path rays.

Techniques have been proposed for detecting locations of path rays. For example, U.S. Pat. No. 5,790,589 discloses a method for locating a path ray by locating the PN code phase offset by initiating a search window on its expected location. The search window is re-located if the code phase offset is not detected. This patent does not address the use of multiple time references.

There is thus a need for an efficient and fast method for detecting the location of path rays in a multi-path receiver using multiple time references.

SUMMARY

It is therefore an object of this invention to provide a technique for detecting locations of path rays in a multi-path receiver having multiple time references.

According to exemplary embodiments, this and other objects are met by a method and apparatus for detecting the locations of path rays in a multi-path receiver having multiple time references. Locations of received path rays are searched for and determined. The locations are tracked for a predetermined amount of time. If the locations are lost after a predetermined amount of time, a new search for the locations of the received path rays is initiated. Searching may be performed by determining a probable location of a most significant path ray, shifting the location within a predetermined interval, analyzing each shifted location to determine whether the shifted location corresponds to the actual location of the received path ray, and depending on the analysis results, completing the search or determining a probable location of a next most significant ray. The analysis of each shifted location may be performed by correlating each shifted location with a pilot sequence and determining if the correlation results exceed a predetermined threshold. If the correlation results do not exceed the threshold, a determination is made whether all the most significant path rays have been analyzed, and if so, a complete search for the path ray location is initiated. The steps may be initiated when the receiver switches from a time reference of low accuracy to a time reference of high accuracy. When switching from a time reference of low accuracy to a time reference of high accuracy, the low accuracy time reference may be calibrated to the high accuracy time reference based on averaged measurements of the ratio of clock cycles of the time reference of high accuracy to the clock cycles of the time reference of low accuracy.

BRIEF DESCRIPTION OF THE DRAWINGS

The features, objects, and advantages of this invention will become apparent by reading this description in conjunction with the accompanying drawings, in which like reference numerals refer to like elements and in which:

FIG. 1 is a block diagram of an exemplary cellular radiotelephone communication system;

FIG. 2A illustrates a typical DS CDMA system;

FIG. 2B illustrates a Rake Receiver in which the invention may be implemented;

FIG. 2C illustrates phase offset and the distance between different path rays;

DETAILED DESCRIPTION

Figure 3:
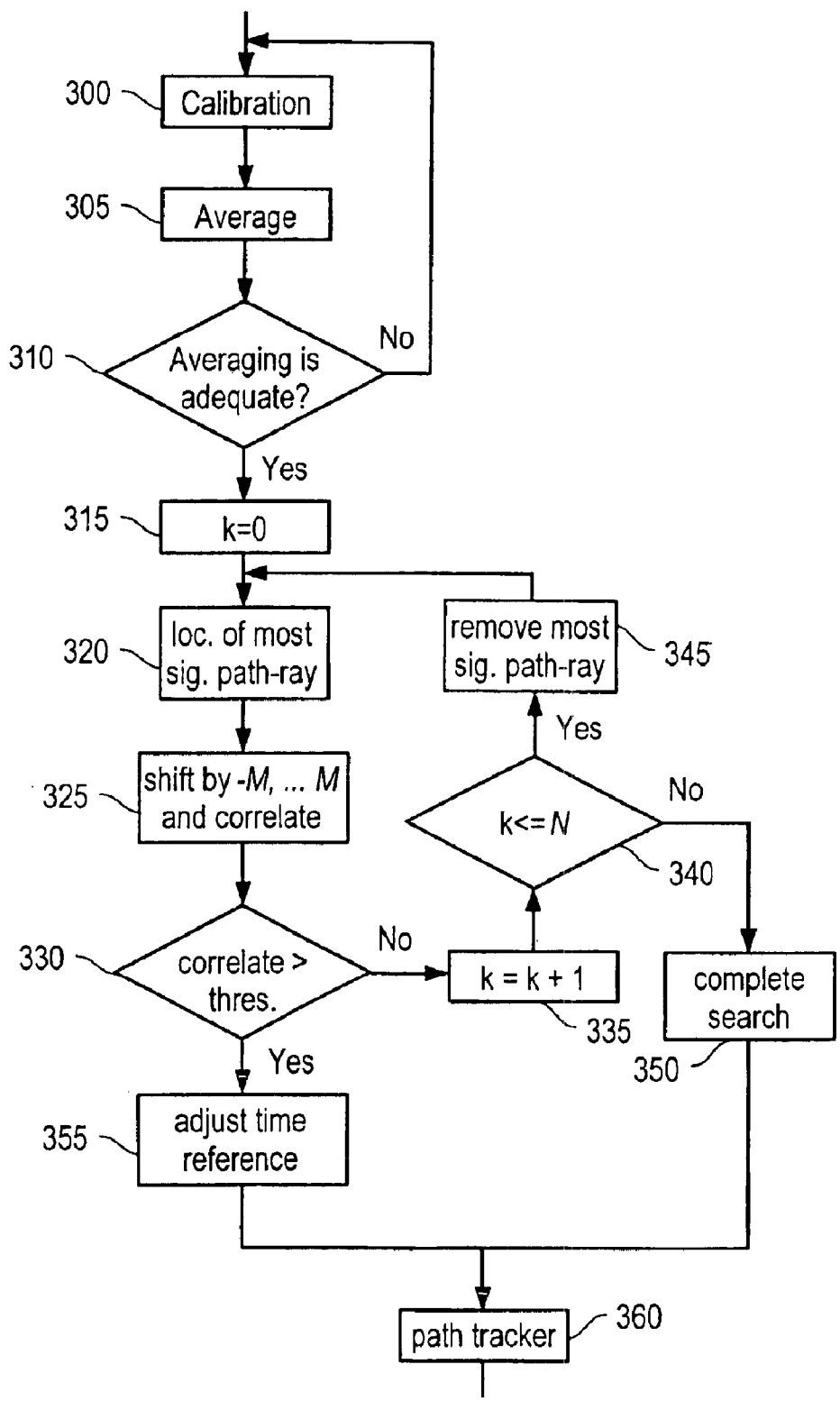
FIG. 3 illustrates a method for detecting locations of path rays in a multi-path receiver according to an exemplary embodiment.

For illustrative purposes, the following description is directed to a cellular radio communication system, but it will be understood that this invention is not so limited and applies to other types of communication systems.

FIG. 2B illustrates an exemplary Rake Receiver in which the invention may be implemented. The Rake Receiver 240 comprises a Searcher 260, Rake Fingers 270, a Path Tracker 280, and a Combiner 290. The Searcher 260 detects the locations of the multi-path rays, and each Rake Finger 270 is assigned a path. The Rake Fingers 270 estimate the corresponding radio channel for the respective paths. The results are then combined using the Combiner 290. The Searcher 260 may include, e.g., matched filters and a peak detector. Path rays are correlated with a certain pilot sequence, resulting in peaks which indicate the location of the path rays. These peaks are detected by the peak detector. The correlations and peak detections make the Searcher 260 computationally complex, and it is desirable to limit its duty cycle.

Conventionally, the locations of path rays are detected only once and then are tracked as long as possible by using the Path Tracker 280. This presents a problem if the path rays are lost, e.g., when changing from a low accuracy crystal to a high accuracy crystal when the MS wakes up to listen to the PCH.

In order to avoid complete searching, the MS can calibrate the sleep mode crystal by using the awake mode crystal when the MS wakes up. This calibration may be based on the measurement and comparison of clock cycles between the crystals. This calibration can take a long time due to the high phase noise of the crystal used in the sleep mode. This is not desirable since the MS should go back to sleep as soon as possible.

According to an exemplary embodiment, the calibration time may be reduced by averaging several short measurements of clock cycles. The averaging can be performed using, e.g., an Finite Impulse Response (FIR) filter in which a certain number of measurements is used or as an Infinite Impulse Response (IIR) filter, in which substantially all the measurements are used. The ratios of clock cycles for the high accuracy clock to each low accuracy clock cycle can be measured and averaged, and the corresponding temperature can be measured. The averaged ratio and the corresponding temperature may be recorded in a temperature compensation table. The number of clock cycles of the low accuracy clock and the number of clock cycles of the high accuracy clock that should elapse between paging periods are calculated from the ratio. Based on the measured temperature and by referring to the compensation table, the phase offsets caused by temperature variation may be accounted for.

According to exemplary embodiments, there are a number of phase offsets caused by the multi-path rays. The phase offsets are grouped, e.g., according to significance based on signal-to-interference ratio (SIR), signal-to-noise ratio (SNR), or amplitude of the multi-path rays. It is assumed that the positions of these phase offsets do not significantly change in relation to each other within a certain short amount of time, for instance when the MS transitions from the wake up state to the sleep state and then back to the wake up state. Therefore, in each search window, there are several opportunities to locate the phase offsets by locking on one of them, e.g., the most significant one, and then searching for the others in the expected locations.

FIG. 2C illustrates the locations of different path rays, with the horizontal axis representing time, and the vertical axis representing power. The solid lines represent the locations of path rays at time $t_1$, e.g., during a wake up state, and the dashed lines represent the locations of path rays at time $t_2$, e.g., during a sleep state. As can be seen from FIG. 2C, after filtering, the distances between the different path rays are the same within a short period of time, but the inaccuracy of the low accuracy clock produces a phase offset. Thus, when a significant ray has been found, the locations of the other rays can be determined with high accuracy. To adjust for the small changes in the distances between the rays, the path tracker is activated.

Having averaged an adequate number of measurements, the crystal with low accuracy can be calibrated so that the shift of the MS time reference is limited within a small number of path ray locations +M. One of the locations indicates the real shift of the time reference. To determine the new time reference, the location of the most significant path-ray from previous observations is shifted within the interval {−M, −M+1, . . . , M} and analyzed to determine if a location within the interval corresponds to the actual location of the received most significant path ray.

If the time reference is found by finding one of the path rays, the locations of other path rays are found based on the relative distances between the found path ray and the other path rays. These relative distances are known and were available before the MS went into the sleep mode. The possible minor shifts of other path rays relative to the found path ray one can be adjusted by minor shifts of the correlator and comparing the results.

If the analysis fails, the location of the next most significant path-ray is analyzed. This task is repeated until the actual location of a path-ray is determined, indicating that the shift of the time reference of the MS is detected. Then, the time shift of the MS is adjusted, and the path tracker is then activated. However, if the analysis fails when having studied the locations of the N most significant path rays, the MS time reference is considered to be lost, and a complete search for the ray locations is then activated.

According to an exemplary embodiment, the most significant path-ray can be, e.g., the most significant one based on SIR, SNR, or amplitude. The analysis for determining the reference time shift can be, e.g., based on a correlation of the received data to the known received pilot signals. The number N can be chosen in such a way that the correlators' complexity does not exceed that of the complete search.

FIG. 3 illustrates a method for detecting a path ray in a receiver according to an exemplary embodiment. The method starts at step 300 at which the low accuracy crystal is calibrated with the high accuracy crystal. At step 305, measurements between time references of the crystals are averaged. At step 310, a determination is made whether the averaging is adequate, depending, e.g., on a desired level of accuracy. If not, the process returns to step 300. If the averaging is adequate, a process variable k is set to zero at step 315. Then, at step 320, the location of the most significant path ray is determined. At step 325, the path ray location is shifted by −M, . . . , M, and each shifted location is analyzed. For example, the shifted path ray locations are correlated with a known pilot sequence. At step 330, a determination is made whether the correlation result is greater than a predetermined threshold. If not, k is incremented by 1 at step 335, and a determination is made at step 340 whether k is less than or equal to N, i.e., a determination is made whether the N most significant path rays have been analyzed. If k is less than or equal to N, the most significant path ray is removed at step 345, and the process returns to step 320. If, at step 340 it is determined that k is not less than or equal to N, a complete search is initiated at step 350. If at step 330, the correlation is found to be greater than the threshold, this means that the actual received path ray location has been found, and the time reference of the MS is accordingly adjusted at step 355. After the time reference is adjusted at step 355 or the search for the path ray location is completed at step 350, the process proceeds to step 360 at which the path tracker tracks the locations of the path rays.

This method can be implemented, e.g., in a microprocessor in the searcher or elsewhere in the multi-path receiver.

According to exemplary embodiments, a method and apparatus are provided for detecting a location of received path rays in a multi-path receiver having multiple time references.

It will be appreciated by those of ordinary skill in the art that this invention can be embodied in other specific forms without departing from its essential character. The embodiments described above should therefore be considered in all respects to be illustrative and not restrictive. For example, although described above with reference to a CDMA communication system, the invention is also applicable in other types of communication systems.

What is claimed is:

1. A method for detecting locations of path rays in a multi-path channel receiver having multiple time references, the method comprising the steps of:

searching for locations of received path rays;

determining the locations of the received path rays; and adjusting at least one of the multiple time references according to the determined location of the received path rays, wherein the step of searching includes:

determining a probable location of a most significant path ray;

shifting the location within a predetermined interval;

analyzing each shifted location to determine whether the shifted location corresponds to the actual location of the received path ray; and depending on the analysis results, completing the search or determining a probable location of a next most significant ray, and wherein the at least one of the multiple time references is adjusted according to an amount based on a difference between the probable location and the determined location of a path ray.

2. The method of claim 1, wherein if the shifted location corresponds to the actual location of the received path ray, the step of completing the search comprises locating the other path rays based on the knowledge of relative distances between the located path ray and the other path rays.

3. The method of claim 1, wherein the step of analyzing includes:

correlating each shifted location with a pilot sequence; and determining if the correlation results exceed a predetermined threshold.

4. The method of claim 3, further comprising, if the correlation results do not exceed the threshold:

determining whether all the significant path rays have been analyzed; and if so, initiating a complete search for the path ray locations.

5. The method of claim 1, wherein the steps are initiated when the receiver switches from a time reference of low accuracy to a time reference of high accuracy.

6. The method of claim 5, further comprising, when switching from the time reference of low accuracy to the time reference of high accuracy, a step of calibrating the low accuracy time reference to the high accuracy time reference.

7. The method of claim 1, wherein the receiver is a cellular radio.

8. The method of claim 1, further comprising:

tracking the locations of the received path rays for a predetermined amount of time; and if the locations are lost after the predetermined amount of time, initiating a new search for the locations of the received path rays.

9. The method of claim 8, wherein tracking the locations includes determining the location of the path rays based on the adjusted time reference and a set of previously known path ray locations.

10. A method for detecting locations of path rays in a multi-path channel receiver having multiple time references, the method comprising the steps of:

searching for locations of received path rays;

determining the locations of the received path rays; and adjusting at least one of the multiple time references according to the determined location of the received path rays, wherein the steps are initiated when the receiver switches from a time reference of low accuracy to a time reference of high accuracy, and the method further comprising, when switching from the time reference of low accuracy to the time reference of high accuracy, a step of calibrating the low accuracy time reference to the high accuracy time reference, wherein the step of calibrating includes averaging measurements of the ratio of clock cycles of the time reference of high accuracy to the clock cycles of the time reference of low accuracy.

11. An apparatus for detecting locations of path rays in a multi-path receiver, the apparatus comprising:

at least two time reference generators;

a tracker for tracking the path rays for a predetermined amount of time; and a searcher for locating the path rays when the predetermined amount of time expires and the locations are lost, wherein at least one of the at least two time reference generators are adjusted according to a location of the path rays, wherein the searcher determines a probable location of a most significant path ray, shifts the location within a predetermined interval, and analyzes each shifted location to determine whether the shifted location corresponds to the actual location of the received path ray, wherein depending on the analysis results, the search is completed or a probable location of next most significant ray is determined and wherein the at least one of the multiple time references is adjusted according to an amount based on a difference between the probable location and the determined location of a path ray.

12. The apparatus of claim 11, wherein if the shifted location corresponds to the actual location of the received path ray, the searcher locates the other path rays based on the knowledge of relative distances between the located path ray and the other path rays.

13. The apparatus of claim 11, wherein the searcher analyzes each shifted location by correlating each shifted location with a pilot sequence and determining if the correlation results exceed a predetermined threshold.

14. The apparatus of claim 13, wherein if the correlation results do not exceed the threshold, the searcher determines whether all the significant path rays have been analyzed, and if so, initiates a complete search for the path ray locations.

15. The apparatus of claim 11, wherein the tracking and searching are performed when switching from a time reference of low accuracy to a time reference of high accuracy.

16. The apparatus of claim 15, wherein when switching from the time reference of low accuracy to a time reference of high accuracy, the time reference of low accuracy is calibrated to the time reference of high accuracy.

17. The apparatus of claim 11, wherein the receiver is a cellular radio.

18. The apparatus of claim 11, wherein the tracker determines the location of the path rays based on the adjusted time reference and a set of previously known path ray locations.

19. An apparatus for detecting locations of path rays in a multi-path receiver, the apparatus comprising:

at least two time reference generators;

a tracker for tracking the path rays for a predetermined amount of time; and a searcher for locating the path rays when the predetermined amount of time expires and the locations are lost, wherein at least one of the at least two time reference generators are adjusted according to a location of the path rays, wherein the tracking and searching are performed when switching from a time reference of low accuracy to a time reference of high accuracy, wherein when switching from the time reference of low accuracy to a time reference of high accuracy, the time reference of low accuracy is calibrated to the time reference of high accuracy, and wherein the calibration includes averaging measurements of the ratio of clock cycles of the time reference of high accuracy to the clock cycles of the time reference of low accuracy.

* * * * *

UNITED STATES PATENT AND TRADEMARK OFFICE
CERTIFICATE OF CORRECTION

PATENT NO. : 6,873,648 B1  
APPLICATION NO. : 09/518063  
DATED : March 29, 2005  
INVENTOR(S) : Roozbeh Atarius et al.

Page 1 of 1

It is certified that error appears in the above-identified patent and that said Letters Patent is hereby corrected as shown below:

Column 1,  
Line 60, change "TIA/EIA/1S-136" to -- TIA/EIA/IS-136 --.  
Line 64, change "TIA/EIA/1S-95" to -- TIA/EIA/IS-95 --.

Signed and Sealed this

Twenty-seventh Day of June, 2006

JON W. DUDAS  
*Director of the United States Patent and Trademark Office*